April 7, 1936.  J. SUNNEN  2,036,238
DEVICE FOR TESTING THE ALIGNMENT OF CONNECTING RODS OF ENGINES
Filed Oct. 2, 1933  3 Sheets-Sheet 1
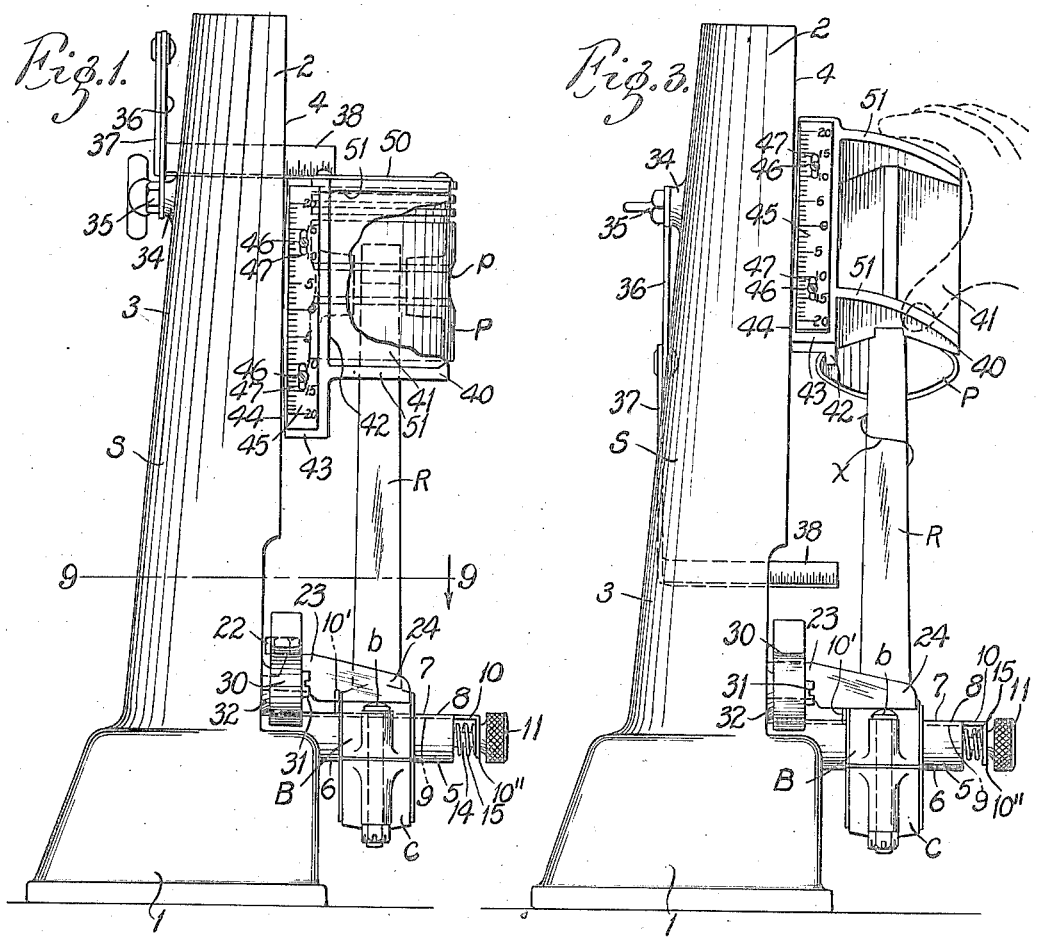
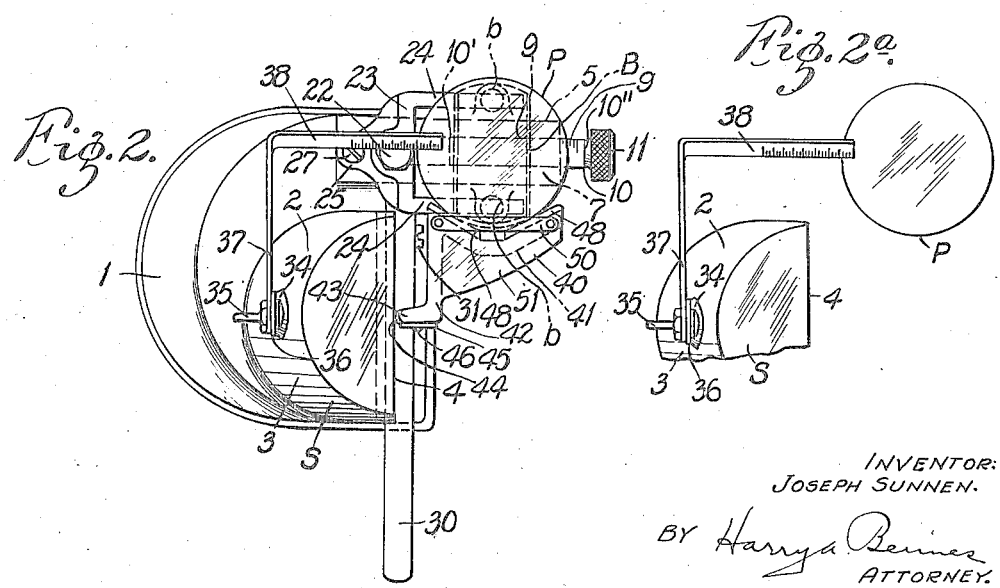
INVENTOR:
JOSEPH SUNNEN.
BY Harry A. Benner
ATTORNEY.

April 7, 1936. J. SUNNEN 2,036,238
DEVICE FOR TESTING THE ALIGNMENT OF CONNECTING RODS OF ENGINES
Filed Oct. 2, 1933 3 Sheets-Sheet 2
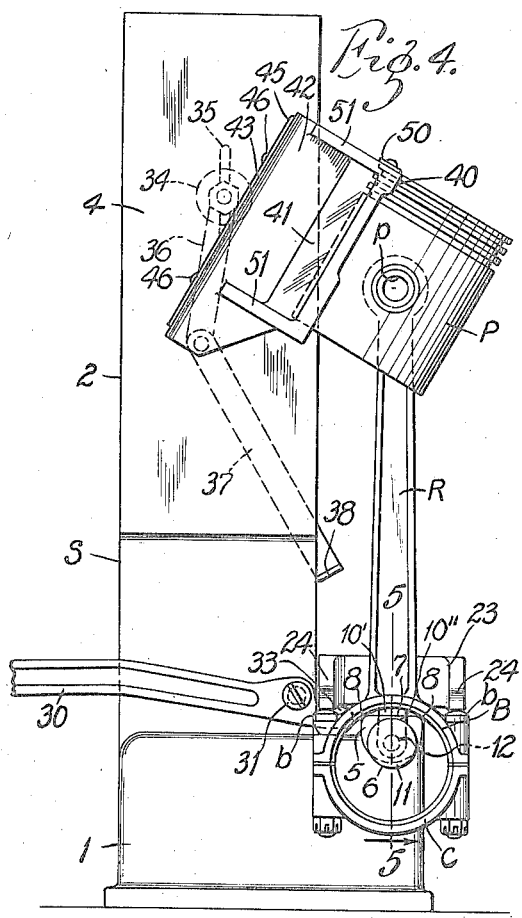
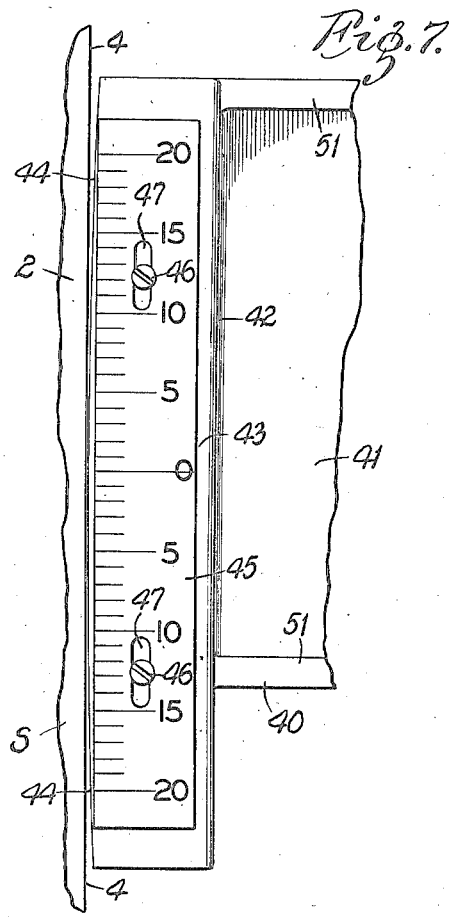
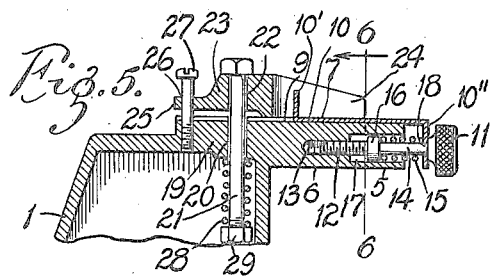
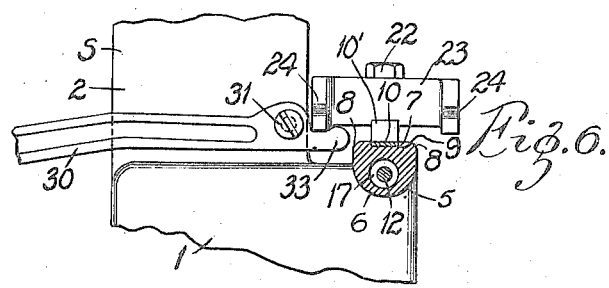
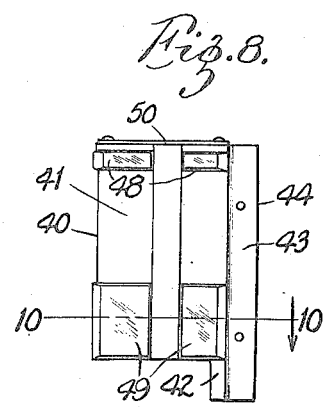
INVENTOR:
JOSEPH SUNNEN.
BY Harry Bennett
ATTORNEY.

April 7, 1936.  J. SUNNEN  2,036,238
DEVICE FOR TESTING THE ALIGNMENT OF CONNECTING RODS OF ENGINES
Filed Oct. 2, 1933   3 Sheets-Sheet 3
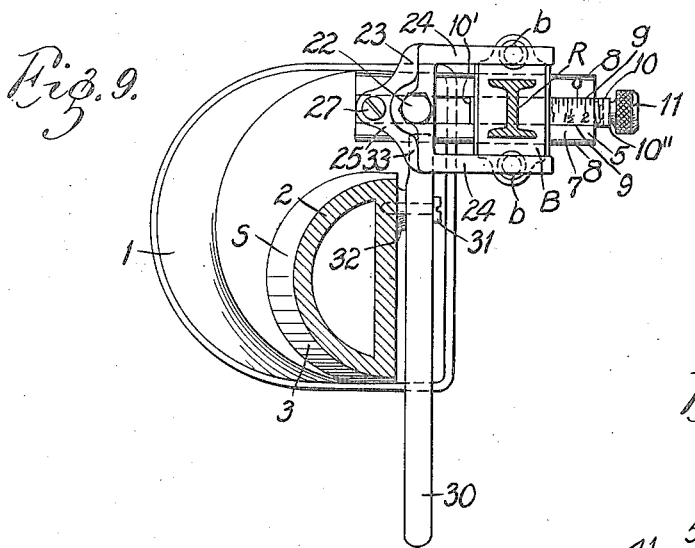
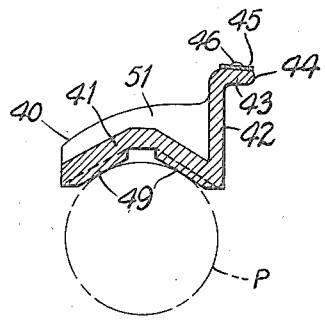
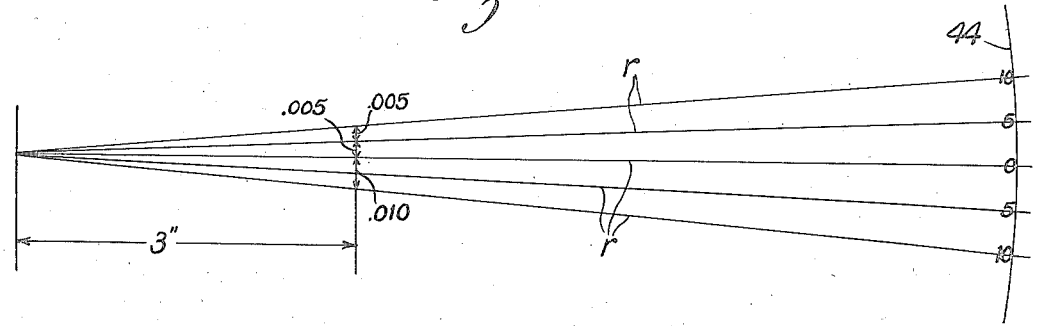
INVENTOR:
JOSEPH SUNNEN.
BY Harry␣Beiner
ATTORNEY.

Patented Apr. 7, 1936

2,036,238

UNITED STATES PATENT OFFICE 2,036,238

DEVICE FOR TESTING THE ALIGNMENT OF CONNECTING RODS OF ENGINES

Joseph Sunnen, Kirkwood, Mo.

Application October 2, 1933, Serial No. 691,762

15 Claims. (Cl. 33—180)

My invention has relation to improvements in devices for testing the alignment of connecting rods of engines, and it consists in the novel features of construction more fully set forth in the specification and pointed out in the claims.

As is well known in the art, the longitudinal axis of the connecting rod bearing and the longitudinal axis of the piston pins must be in absolute parallelism for the proper operation of the pistons and the cylinders of the engine. When an engine leaves the factory where it was manufactured presumably these axes are in parallelism and the piston and connecting rod are in alignment. However, after considerable operation of the engine it is common for this alignment to be disturbed, either because the connecting rod may become bent or twisted. The bending of the connecting rod of course causes the piston pin to become inclined with respect to the crank shaft, and the twisting of the connecting rod causes the piston pin to become angularly rotated with respect to the crank shaft, and in either event the piston slaps or teeters in the cylinder, resulting in loss of compression, pumping of oil and noise.

Many devices have been devised for the purpose of testing and restoring the piston and connecting rod alignment, but as far as I am aware none of such devices heretofore in use have been capable of testing the alignment with the necessary degree of accuracy, nor have they been capable of indicating the amount of misalignment caused both by a bent and a twisted connecting rod.

It is one of the objects of the present invention to provide an alignment testing device that is capable of showing the mechanic either a bend or a twist in the connecting rod and the amount of misalignment caused thereby.

It is a further object of my improved testing device to provide a supporting arbor for the connecting rod that may be adjustable so that the connecting rod may be centered with respect to the surface from which readings are taken, irrespective of the size of the connecting rod bearing. A still further object of the invention is to provide a gauge member for cooperation with the supporting member for the connecting rod and piston assembly which may be applied to the surface of the piston to indicate in thousandths of an inch the amount of inclination of the piston skirt due to misalignment.

The invention also embodies a scale which may be applied to the piston when the piston and connecting rod assembly is mounted on the testing device whereby readings may be obtained to indicate the amount of offset of the connecting rod.

Further and other advantages, such as simplicity, durability and rigidity will be readily apparent from a detailed description of the invention in connection with the accompanying drawings, in which:

Figure 1 is a side elevation of my improved connecting rod alignment testing device with a piston and connecting rod assembly mounted thereon and the gauge block (partly broken away) applied to obtain an alignment reading; Fig. 2 is a top plan of my improved device with the piston and connecting rod assembly in place and the gauge block applied thereto; Fig. 2a is a top plan of the offset scale and piston showing a reading taken to indicate the amount of offset in the connecting rod; Fig. 3 is a side elevation similar to that shown in Fig. 1 except that the offset scale has been swung downwardly to its position when not in use and the piston has been tilted to obtain a reading to indicate the amount of misalignment due to a twist in the connecting rod; Fig. 4 is a front elevation of the invention with the respective elements in the same position in which they are shown in Fig. 3; Fig. 5 is a vertical sectional detail taken on the line 5—5 of Fig. 4 through the arbor for supporting the connecting rod and the clamp that holds the connecting rod in place thereon; Fig. 6 is a cross-sectional detail through the arbor taken on a plane indicated by the line 6—6 of Fig. 5; Fig. 7 is an enlarged view of the scale portion of the gauge block showing the effective edge thereof in contact with the leveling surface to obtain a reading as to the amount of misalignment of the piston connecting rod assembly; Fig. 8 is a rear view of said gauge block; Fig. 9 is a horizontal cross-section taken on the line 9—9 of Fig. 1; Fig. 10 is a cross-sectional detail taken through the gauge block on the line 10—10 of Fig. 8; and Fig. 11 is a diagrammatic view showing how the graduations on the scale of the gauge block are obtained.

Referring to the drawings, S represents a supporting member or standard comprising a base 1 and a trunk 2 extending upwardly therefrom, the entire standard being cast hollow and in a single piece, and the trunk 2 having a conical wall 3 intersecting a plane surface 4 extending downwardly from the top of the trunk to a short distance above the base 1. The plane surface 4 is machined absolutely true and might be termed the leveling surface or gauging element as it is against this surface that the piston is tested to determine its alignment with the connecting rod bearing. Projecting outwardly from the top of the base 1 to one side of the leveling surface 4 is an arbor 5, said arbor being of the shape in cross-section of a part of a circle, that is, it has a bottom convex surface 6 and a top plane horizontal surface 7, said surfaces intersecting to form the rounded corners 8, 8. These rounded corners 8, 8 are machined so that they are absolutely perpendicular to the leveling surface 4 for a reason that will be apparent hereinafter. A square-cut groove 9 is formed in the plane surface 7 of the arbor and a plate 10 is slidably mounted in said groove, said plate having its inner end 10' turned upwardly to form an abutment member, and its outer end 10" bent downwardly in front of the end of the arbor so that the knurled head 11 of an adjusting screw 12 may engage the turned down end 10" for effecting adjustments of the plate 10. The inner end of the screw 12 is threaded and received in a threaded socket 13 of the arbor, and the outer end 14 of said screw is of reduced diameter and has coiled upon it a spring 15 bearing at one end against the end 10" of the plate 10 and at the opposite end against a shoulder 16 formed on the screw between the threaded end and the reduced portion 14. The spring 15 and the shoulder 16 operate in a socket 17 formed in the end of the arbor as shown in Fig. 5. The end 10" of the plate 10 has an opening 18 in which the stem 14 is loosely fitted and the function of the spring 15 is to maintain the plate 10 pushed outwardly in engagement with the knurled head 11 of the screw 12. It is apparent that by turning the knurled head 11 so as to cause the screw to enter its threaded socket the plate 10 will be pushed inwardly, and by turning the head 11 in the opposite direction to withdraw the screw 12 the spring 15 will force the plate 10 outwardly.

In the top wall 19 of the hollow base 1 and in line with the longitudinal axis of the arbor 5 is a bore 20, through which is passed a bolt 21, having its outer end also passing through a bore 22 of a bifurcated member 23. The member 23 has two forwardly projecting fingers 24, 24 and a rearwardly extending lug 25 having an opening 26, through which is passed a stud 27 screw-threaded into the wall 19 of the base 1. The inwardly extending part of the bolt 21, which is within the hollow base 1, has a coiled spring 28 mounted on it and held in place by a nut 29 screw-threaded on the inner end of the bolt 21. The mounting of the bifurcated member 23 is thus such that it is capable of moving upwardly and downwardly, away from and toward the arbor 5, the spring 28 operating to hold said bifurcated member downwardly in its lowermost position. A lever 30 is pivotally mounted on a stud 31 screw-threaded into the flat surface 32 just above the base 1 and has its short lever arm 33 nosed under the adjacent finger 24 so that said lever may be operated to overcome the tension of the spring 28 and raise the bifurcated member 23. It will be observed that the lever 30 is in line with the bolt 21 on which the member 23 is mounted so that it will lift said member more or less directly upwardly.

At the rear of the conical wall 3 (that is, directly opposite the leveling surface 4) is a boss 34 to which is rotatably secured by means of a stud 35 connected levers 36 and 37. The lever 37 is bent in the form of a right angle so that it has a forwardly extending portion 38 having scale graduations marked on it from its forward end inwardly. These graduations are for the purpose of measuring the amount of offset in a connecting rod, as will be explained later in connection with the operation of the invention.

The parts so far described, while complete in themselves so far as measuring the amount of offset in the connecting rod is concerned, do not form the complete device for testing the alignment of the piston and connecting rod assembly. In order to determine this alignment I also use what may be termed a testing block or gauge block 40 which in general is V-shaped, as shown in Figs. 8 and 10, for which reason I may also refer to this as a V-block. The block comprises a V-shaped plate 41, at one side of which there is a projecting portion 42 which forms an acute angle with the plate 41 and has a laterally extending flange 43, the outer edge of which is round, as shown at 44. The edge 44 after the manner of its use may be termed a gauging edge and is not only rounded in cross-section (as shown in Fig. 10) but is also formed from one end to the other as a perfect arc and cooperates with a scale 45 fixed to the outer surface of the flange 43 to indicate the amount of misalignment in the connecting rod assembly. The scale 45 is secured in the flange 43 by means of screws 46, 46 and slots 47, 47 formed in the scale plate 45. On the concave or inside surface of the V-plate 41 there are two pairs of bosses 48, 48 and 49, 49, the faces of which are machined so that the face of each boss 48 lie in absolutely the same plane as the face of the boss 49 on the corresponding side of the V-block. Thus, the bosses 48 and 49 form contact surfaces when the V-block is applied to the surface of a piston, the alignment of which is being tested. To facilitate the application of the V-block to the piston, the sides of the V-block are spanned at the top by a closure strip 50, as shown in Fig. 2. Of course, it is equally within the spirit of the invention to form a web across the top of the block instead of using the strip as shown. For the sake of rigidity, reenforcing ribs 51, 51 are formed on the outer surface of the V-plate 41 connecting said plate with the back of the projecting portion 42.

The operation of my improved connecting rod alignment tester may be described as follows:

The operator places the assembled connecting rod R and piston P on the arbor 5, first noting the width of the connecting rod bearing B so that he may adjust the scale plate 10 to the proper position, as indicated by the graduations g on said plate. For instance, if the connecting rod bearing is 1¾" wide he adjusts the plate 10 so that the 1¾" graduation will come opposite the zero mark on the arbor. By thus positioning the connecting rod the center line thereof will be the correct distance from the leveling surface 4 for the proper use of the V-block 40. The connecting rod bearing rests on the supporting surfaces 8, 8 of the arbor and will therefore be in true perpendicularity to the leveling surface 4. Before positioning the connecting rod bearing on the arbor the bifurcated member 23 is raised by the manipulation of the lever 30 and after the connecting rod is properly placed the lever is released and the spring 28 will hold the fingers 24, 24 firmly in engagement with the bolts b that hold the cap c of the connecting rod bearing in place. The connecting rod and piston assembly is now properly supported for the testing operations, the first of which is to check the amount of offset (if any there be) in the connecting rod. In the connecting rod shown in the drawings there is no offset but, as is well known in the art, some connecting rods are offset with respect to the bearing B. This amount of offset is determined by the use of the right angle lever scale 38 on which the operator notes the location of the peripheral edge of the piston P. In Fig. 2, assuming the graduations on the scale 38 to be $\tfrac{1}{16}''$, the reading is $\tfrac{6}{16}''$. The operator now reverses the position of the connecting rod on the arbor 5 so that he may obtain a reading for the opposite side of the piston. If this reading is approximately the same then he will know there is no appreciable offset in this connecting rod, and if the manufacturer of the connecting rod originally designed the same without an offset the operator knows he need not further concern himself with the amount of offset. On the other hand, should the second reading after reversing the position of the connecting rod be appreciably different from the first, such as, $\tfrac{4}{16}''$, as shown in Fig. 2a, the operator will know that half of the difference between $\tfrac{4}{16}''$ and $\tfrac{8}{16}''$, or $\tfrac{2}{16}''$, is the amount of offset in this particular connecting rod. If this checks with the manufacturer's specifications then the operator need take no further note of the amount of offset. However, should the specifications require a ¼'' offset then this should be taken into consideration by the operator in performing his bending operations for obtaining the proper alignment of the connecting rod.

Having checked the offset of the connecting rod the operator may now proceed with the determination of the amount of misalignment thereof, either because of bends or twists in the connecting rod. We will first proceed with the determination of the amount of misalignment due to a bent connecting rod. In making this determination the operator uses the V-block 40 by applying the same to the surface of the piston (as shown in Figs. 1 and 2). It will be noted (Figs. 2, 3 and 4) that the V-block is applied to the part of the surface of the piston lying between the piston pin bosses, the longitudinal axis of which is perpendicular to the gauging element 4. This method of applying the V-block causes the edge 44 of flange 43 to be presented toward the gauging surface 4 with which it may be brought into contact by slightly rotating the V-block on the piston surface. In applying the V-block the operator will first see that the piston is perpendicular with the connecting rod and not tilted on the piston pin p. Then he places the V-block against the piston with the bar 50 resting on the top of the piston and the bearing surfaces 48 and 49 in contact with the piston skirt. The V-block is then rotated until the arcuate edge 44 thereof contacts with the leveling surface or gauging element 4. The operator then takes a sight across the edge 44 and notes the point of contact. Should this point of contact be at the zero graduation of the scale 45 the operator will know that there is no misalignment on account of the connecting rod being bent. However, should the point of contact be either above or below the zero point the operator will know that the connecting rod is bent and may note the direction accordingly to whether the contact is either above or below the zero mark on the scale 45, and he may also note the amount of the misalignment from the scale 45. This scale is graduated so that it will indicate thousandths of an inch of misalignment for the length of the piston skirt, which is approximately 3''. This is indicated diagrammatically in Fig. 11 where the arcuate edge 44 of the V-block is intersected by a series of radii r, these radii being spaced .005'' at a distance of 3'' from the center of the arc defining the edge 44. Of course, after the operator knows the amount of misalignment caused by the bent connecting rod he proceeds to straighten the same and then continue to check the connecting rod until his reading on the scale 45 is zero.

The operation for determining the amount of misalignment due to a twisted connected rod is quite similar except that the amount of twist which causes a rotation of the piston pin in a horizontal plane cannot be shown unless the piston P is rotated out of a true vertical position. The operator therefore applies his V-block as before and rotates the piston P, as shown in Figs. 3 and 4, and then determines what his reading is on the scale 45. Obviously, if the reading indicates that the connecting rod is twisted by showing a point of contact between edge 44 and leveling surface 4, either above or below the zero line, the operator will also know the direction of the twist depending on whether the point of contact is above or below the zero line. For example, Figs. 3 and 4 show that on tilting the piston so as to move the head of the piston away from the leveling surface 4 a reading below the zero line is obtained on the scale 45. This reading would indicate that the twist is in the direction of the arrow x (Fig. 3). Obviously, if by tilting the piston in the same direction the reading had been on the opposite side of the zero line it would have indicated a twist in the opposite direction.

From the foregoing it is apparent that by using the V-block to obtain the readings showing the misalignment of the connecting rod no adjustments have to be made to accommodate the device to different sizes of pistons as the V-block 40 is applied to the surface of the piston and is the same distance from the leveling surface 4, irrespective of the size of the piston (within the limitations, of course, for which the tool is designed). For this reason, it is important that the center line of the piston, irrespective of its size, always be approximately the same distance from the leveling surface 4 in the making of determinations. It is for this reason that the graduated adjusting plate 10 forms a part of the arbor 5.

Having described my invention, I claim:

1. A device for testing the alignment of connecting rods comprising a suitable supporting member, an arbor and a gauging element supported thereby, said arbor being perpendicular to the gauging element, a bifurcated clamp mounted on the supporting member above the arbor and having movement to and from the arbor, means for holding the clamp against upward movement, and a lever having one end in engagement with the clamp and operable to raise said clamp.

2. In a device for testing the alignment of piston and connecting rod assemblies, the combination of a supporting member, said supporting member having a gauging element and means for supporting the piston and connecting rod assembly in a position so that the longitudinal axis of the connecting rod bearing is perpendicular to said gauging element, and a testing block having spaced bearing surfaces for contact with the piston, said testing block also having an arcuate component for contact with the gauging element to indicate misalignment of the assembly.

3. In a device for testing the alignment of piston and connecting rod assemblies, the combination of a supporting member, said supporting member having a gauging element and means for supporting the piston and connecting rod assembly in a position so that the longitudinal axis of the connecting rod bearing is perpendicular to said gauging element, and a testing block having spaced bearing surfaces for contact with the piston, said testing block also having an arcuate component for contact with the gauging element to indicate misalignment of the assembly, said arcuate component being calibrated to indicate the amount of misalignment.

4. A device for testing the alignment of connecting rods comprising a suitable supporting member, an arbor and a gauging element supported thereby, said arbor being perpendicular to the gauging element, and adapted to receive a connecting rod bearing, a bifurcated clamp mounted on the supporting member above the arbor to engage the bearing and hold the rod on said arbor and having movement to and from the arbor, and spring means for holding the clamp against upward movement.

5. In a device for testing the alignment of piston and connecting rod assemblies, the combination of a supporting member, said supporting member having a gauging element and means for supporting the piston and connecting rod assembly in a position so that the longitudinal axis of the connecting rod bearing is perpendicular to said gauging element, and a testing block having bearing surfaces for contact with the piston, said testing block also having an arcuate component for contact with the leveling surface to indicate misalignment of the assembly.

6. A device for testing the alignment of connecting rods comprising a suitable supporting member, an arbor and a gauging element supported thereby, said arbor being perpendicular to the gauging element, a vertically movable bifurcated clamp mounted on the supporting member above the arbor and having fingers extending parallel with the arbor, and means for holding the clamp against upward movement.

7. In a device for testing the alignment of piston and connecting rod assemblies, the combination of a suitable supporting member, an arbor and a gauging element carried by the supporting member, said arbor being perpendicular to the gauging element, means for holding the piston and connecting rod assembly on the arbor, and a calibrating member for cooperating with the gauging element to indicate misalignment of the assembly, said calibrating member having an element adapted to fit snugly against the piston, and a second element disposed at one side of a plane bisecting the first element and to the rear of said first element.

8. In a device for testing the alignment of piston and connecting rod assemblies, the combination of a supporting member having a gauging element, and means for supporting the piston and connecting rod assembly in a position so that the longitudinal axis of the connecting rod bearing is perpendicular to the gauging element, and a testing block having opposed bearing surfaces for contact with the piston, said block also having a gauging edge adapted for contact with the gauging element, said gauging edge being disposed at one side of a medial plane passing longitudinally between the opposed bearing surfaces of the block and to the rear of said bearing surfaces.

9. In a device for testing the alignment of piston and connecting rod assemblies, the combination of a suitable supporting member, a gauging element and an arbor carried thereby, said arbor being perpendicular to the gauging element, means for holding the piston and connecting rod assembly on the arbor, and a member for cooperating with the gauging element to indicate misalignment of the assembly, said member having an angular element adapted to fit snugly against the piston, and a gauging element disposed at one side of a plane bisecting the angular element and to the rear thereof.

10. In a device for testing the alignment of piston and connecting rod assemblies, the combination of a supporting member having a gauging element, and means for supporting the piston and connecting rod assembly in a position so that the longitudinal axis of the connecting rod bearing is perpendicular to said gauging element, and a testing block having oppositely disposed bearing surfaces for contact with a piston, and said block having an element for contact with the gauging element, said last named element being disposed to one side of a medial longitudinal plane between the opposed bearing surfaces and to the rear of said surfaces.

11. In a device for testing the alignment of piston and connecting rod assemblies, the combination of a supporting member having a gauging element, and means for supporting the piston and connecting rod assembly in a position so that the longitudinal axis of the connecting rod bearing is perpendicular to said gauging element, and a testing block comprising an angular component for contact with the piston, said block also having a second component disposed to the rear of the first component and projecting outwardly in a plane perpendicular to a plane bisecting the angle of the first component.

12. In a device for testing the alignment of piston and connecting rod assemblies, the combination of a supporting member, said supporting member having a gauging element, and means for supporting the piston and connecting rod assembly in a position so that the longitudinal axis of the connecting rod bearing is perpendicular to said gauging element, and a testing block having opposed bearing surfaces for contact with the piston, said block also having a flange disposed to the rear of said bearing surfaces and projecting outwardly in a plane perpendicular to a medial longitudinal plane between the opposed bearing surfaces, the outer edge of said flange being coextensive with said bearing surfaces.

13. In a device for testing the alignment of piston and connecting rod assemblies, the combination of a supporting member, said supporting member having a gauging element, and means for supporting the piston and connecting rod assembly in a position so that the longitudinal axis of the connecting rod bearing is perpendicular to said gauging element, and a testing block having oppositely disposed bearing surfaces for contact with the piston and an element disposed to the rear of the bearing surfaces, said element having an edge lying to one side of a medial plane passing longitudinally between the bearing surfaces and presented toward the gauging element when the block is applied to the surface of the piston lying between the piston pin bosses.

14. In a device for testing the alignment of piston and connecting rod assemblies, the combination of a supporting member, said supporting member having a gauging element, and means for supporting the piston and connecting rod assembly in a position so that the longitudinal axis of the connecting rod bearing is perpendicular to said gauging element, and a testing block comprising an angular member for contact with the piston, said block also having a gauging edge coextensive longitudinally with the block and to the rear of the angular member, and said edge lying in a plane parallel with the plane bisecting the angular member.

15. In a device for testing the alignment of piston and connecting rod assemblies, the combination of a supporting member, said supporting member having a gauging element, and means for supporting the piston and connecting rod assembly in a position so that the longitudinal axis of the connecting rod bearing is perpendicular to said gauging element, and a V-shaped testing block adapted to be applied to the piston, said block having a gauging edge disposed rearwardly of the block and presented toward the gauging element when the block is applied to that part of the piston surface lying between the piston pin bosses.

JOSEPH SUNNEN.